UNITED STATES PATENT OFFICE.

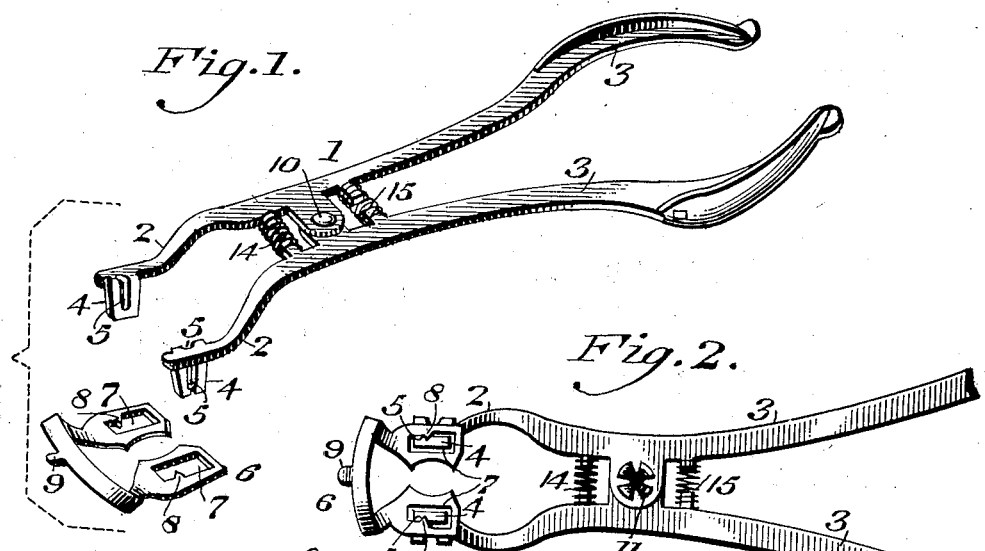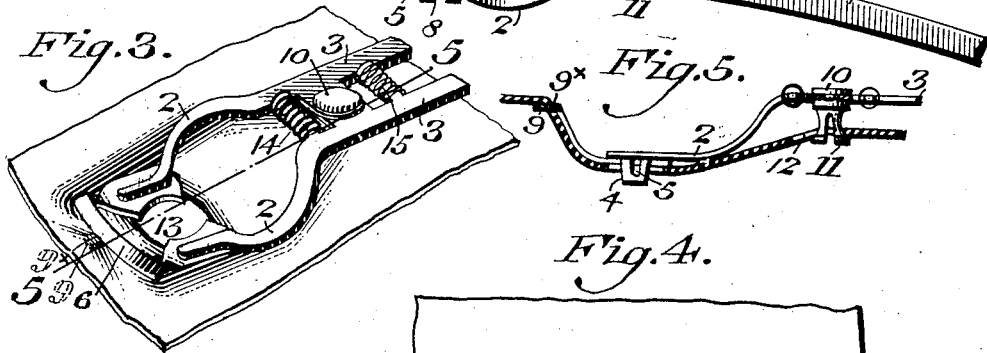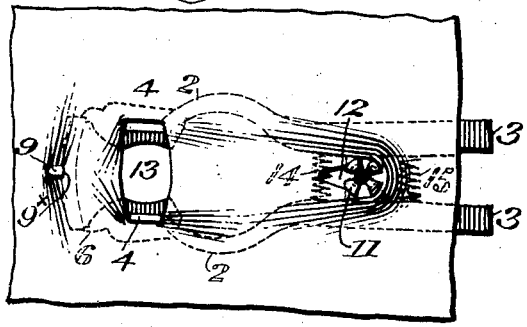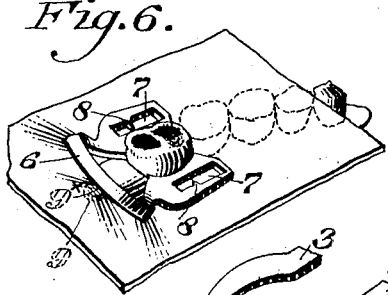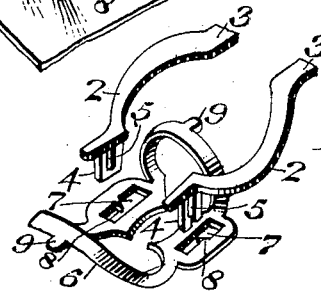

JAMES W. IVORY, OF PHILADELPHIA, PENNSYLVANIA.

RUBBER-DAM-CLAMP APPLIANCE.

1,336,746.      Specification of Letters Patent.      Patented Apr. 13, 1920.

Application filed September 30, 1919. Serial No. 327,558.

*To all whom it may concern:*

Be it known that I, JAMES W. IVORY, a subject of the King of Great Britain, residing in the city and county of Philadelphia, State of Pennsylvania, have invented a new and useful Rubber-Dam-Clamp Appliance, of which the following is a specification.

My invention relates to a rubber dam clamp appliance and consists of the combination of a rubber dam clamp and a forcep therefor forming an appliance for the adjustment of a rubber dam to a tooth, said forcep coöperating with the lip on the bow of the clamp, beaks on the forcep, lips on the pivot of the forcep, combining for the above named purpose with said beaks adapted to disengage the dam from the tooth, and springs of different tension being attached to the forcep for purposes to be hereinafter described.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of a forcep, and a rubber dam clamp forming appliances embodying my invention, the former being in condition to be applied to the latter.

Fig. 2 represents a top plan view of said members in operative position.

Fig. 3 represents a top plan view of the device preparatory to appliance to a tooth.

Fig. 4 represents a bottom plan of Fig. 3.

Fig. 5 represents a longitudinal section on line 5—5 Fig. 3.

Fig. 6 represents a perspective view of the rubber dam, and the clamp in position on a tooth.

Fig. 7 represents a perspective view of a double bow form of a rubber dam clamp, and a portion of a forcep, disconnected therefrom.

Similar numerals of reference indicate corresponding parts in the figures. Referring to the drawings, 1 designates a forcep for a rubber dam clamp, the same consisting of the pivotal jaws 2, and handle 3, which excepting the features of my invention applied thereto, are of usual construction.

4 designates beaks or flanges on the jaws 2, the same extending angularly downwardly therefrom and having therein in the direction of the length thereof the recesses or slots 5. 6 designates a rubber dam clamp, in the jaw portions of which are the recesses 7, a side wall of each of which has thereon the inturned tongues 8, it being noticed that the beaks 4 are adapted to enter said recesses and be seated therein, and the tongues 8 are adapted to enter said recesses 5 and engage therewith, thus engaging the forcep with the clamp and vice versa.

It will be noticed that the recesses 7 and the beaks 4 are angular and elongated and adapted to spread the clamp and prevent turning of the clamp on said beaks. The entire width of the beaks 4 do not have a bearing entirely across the face of the beaks but only in the front part, or in the front part of the recesses 5. On the distal edge of the bow 6 of the clamp is the lip or tongue 9 which is adapted to enter an opening $9^\times$ made in the rubber dam. Without said aperture $9^\times$ the rubber may be stretched over the tongue 9.

The axial pin 10 of the forcep is continued downwardly forming the lip 11 flanged on its under end, the same being adapted to enter the opening 12 made in the rubber dam, or hold the rubber as it is stretched over said lip 11.

13 designates the space between the jaw portions of the rubber dam clamp, and the aperture in the rubber dam enlarged. Connected with the forcep forward of the axial pin 10 is the spring 14, and connected with the same rearward of said pin is the spring 15, said spring being of different tensions, the spring 14 being the stronger.

The operation is as follows:—

The rubber dam is punctured with an aperture of the right size in the face of its substance. The rubber through this aperture is stretched over the beaks or flanges 4 of the forcep after said beaks or flanges are applied to the oblong recesses 7 in the bases of the jaws of the clamp, as shown in Figs. 3 and 4. The fold of the rubber dam is pulled forward to engage the lip 11 on the pivot 10 while the rearward fold thereof is stretched over the tongue 9 on the bow of the clamp 6. The spring 14 throws the beaks or flanges 4 to hold them on the clamp, said spring being for this purpose stronger than the spring 15. Then the position of the whole appliance is as shown in Fig. 3, and the dotted section Fig. 6, or upturned, as in Fig. 4.

The whole appliance is now ready to apply the rubber dam to a tooth in the mouth. The operator holding the appliance and spreading the clamp enlarging the aperture in the rubber dam as at 13 and looking through the aperture 13 sees the tooth to which the clamp and rubber dam are to be applied, then places the clamp on the tooth, the lips of the dam passing between contiguous teeth. The folds of the rubber are now disengaged from the lip 11 of the forcep, and from the tongue 9 of the clamp.

The forcep released from the clamp is removed when the tongues 8 in the recesses 7 strip the rubber dam from the beaks as the latter passes out through the slots 5. Then the part of the rubber dam that was on the beaks 4 slips beneath the clamp and clings around the neck of the tooth and is held by the clamp from being displaced from the tooth, the lips of the rubber dam encircling the entire neck of the tooth, and both clamp and rubber dam are in the position, as shown in Fig. 6.

If other teeth are to be operated on, anterior to the tooth clamped, additional apertures are made in the rubber dam anterior to the aperture that is used with this appliance, as is usual in ordinary practice.

Having thus described my invention what I claim as new and desire to secure by Letters Patent, is:—

1. In a rubber dam and clamp appliance, a forcep provided with beaks extending angularly downwardly therefrom, and recesses in said beaks extending in the perpendicular direction thereof for engagement with relative members of a rubber dam clamp.

2. A rubber dam and clamp appliance consisting of a forcep provided with beaks on the jaws thereof, said beaks having recesses therein, and a rubber dam clamp having in the jaw members slots to receive said beaks, and projections which are adapted to enter the recesses in the latter.

3. A rubber dam and clamp appliance consisting of a forcep provided with beaks on the jaws thereof, said beaks having recesses therein, and a rubber dam clamp having in the jaw members slots to receive said beaks, said beaks and slots being of elongated form.

4. In a rubber dam and clamp appliance, a forcep provided with beaks on the jaws thereof which extend downwardly therefrom, and springs of different tension connected with the forcep on opposite portions of the pivot of the forcep.

5. In a rubber dam and clamp appliance, a forcep provided with beaks on the jaws thereof, a rubber dam clamp in whose jaw members said beaks are adapted to enter and engage, and a projection on the bow of said clamp adapted to penetrate the rubber dam.

6. In a rubber dam and clamp appliance, a forcep provided with beaks on the jaws thereof, and a rubber dam clamp, the pivotal axis of said forcep having an extension adapted to penetrate the rubber dam.

7. In a rubber dam and clamp appliance, a forcep provided with beaks on the jaws thereof, and a rubber dam clamp in whose jaw members said beaks are adapted to enter and engage, a forward projection on the bow of said clamp, and an extension of the pivotal axis of said forcep, said projection and extension being adapted to penetrate different portions of a rubber dam.

JAMES W. IVORY

Witnesses:
JOHN A. WIEDERSHEIM,
N. BUSSINGER.